United States Patent
Crucs (12)

(10) Patent No.: US 8,219,497 B2
(45) Date of Patent: Jul. 10, 2012

(54) SYSTEM AND METHOD FOR ANONYMOUSLY SERVICING LOTTERY PLAYERS

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 1033 days.

(21) Appl. No.: 12/171,753

(22) Filed: Jul. 11, 2008

(65) Prior Publication Data

US 2010/0009739 A1    Jan. 14, 2010

(51) Int. Cl.
*G06Q 20/00* (2012.01)

(52) U.S. Cl. .......... 705/78; 705/64; 705/77; 705/14.12; 463/29

(58) Field of Classification Search ............... 463/16, 463/17, 29; 705/64, 77
See application file for complete search history.

(56) References Cited

U.S. PATENT DOCUMENTS

| | | | |
|---|---|---|---|
| 4,191,376 A | 3/1980 | Goldman et al. | |
| 4,398,708 A | 8/1983 | Goldman et al. | |
| 4,832,341 A | 5/1989 | Muller et al. | |
| 5,119,295 A | 6/1992 | Kapur | |
| 5,365,575 A | 11/1994 | Katz | |
| 5,573,110 A | 11/1996 | Nguyen | |
| 5,787,156 A | 7/1998 | Katz | |
| 5,887,906 A | 3/1999 | Sultan | |
| 6,044,135 A | 3/2000 | Katz | |
| 6,267,670 B1 * | 7/2001 | Walker et al. | 463/17 |
| 6,424,703 B1 | 7/2002 | Katz | |
| 6,497,408 B1 * | 12/2002 | Walker et al. | 273/138.1 |
| 6,533,274 B1 | 3/2003 | Heggerty | |
| 6,929,544 B2 * | 8/2005 | Osterer | 463/17 |
| 6,938,019 B1 * | 8/2005 | Uzo | 705/65 |
| 7,093,130 B1 * | 8/2006 | Kobayashi et al. | 713/176 |
| 7,162,433 B1 * | 1/2007 | Foroutan | 705/7.42 |
| 7,630,986 B1 * | 12/2009 | Herz et al. | 1/1 |
| 7,749,078 B2 * | 7/2010 | Vlazny et al. | 463/28 |
| 7,976,373 B2 * | 7/2011 | Kroeckel et al. | 463/16 |
| 8,113,950 B2 * | 2/2012 | Lapstun et al. | 463/29 |
| 2001/0026610 A1 | 10/2001 | Katz | |
| 2001/0039204 A1 * | 11/2001 | Tanskanen | 463/17 |

(Continued)

FOREIGN PATENT DOCUMENTS

CA    2020715    1/1992

(Continued)

*Primary Examiner* — Mamon Obeid
(74) *Attorney, Agent, or Firm* — Hahn Loeser & Parks LLP

(57) ABSTRACT

A system and method for servicing at least one lottery player while protecting an identity of the at least one lottery player. The system includes a server platform of a third party organization that facilitates the method. The method includes receiving a client request at the server platform via a communications network. The method further includes the third party organization obtaining at least one lottery ticket in response to the client request, and securely holding the at least one lottery ticket for the at least one lottery player specified in the client request. The method also includes the third party organization determining a status of the at least one lottery ticket via the server platform and the communications network. The method further includes the third party organization transforming the at least one lottery ticket into a monetary amount if a status of the at least one lottery ticket is or changes to a winning status. The method also includes the third party organization securely transferring at least a first portion of the monetary amount to at least one account or trust.

29 Claims, 4 Drawing Sheets

U.S. PATENT DOCUMENTS

| | | | |
|---|---|---|---|
| 2002/0006821 A1* | 1/2002 | Park | 463/17 |
| 2002/0082085 A1 | 6/2002 | Osterer | |
| 2002/0093190 A1 | 7/2002 | Katz | |
| 2002/0100785 A1 | 8/2002 | Roberts et al. | |
| 2002/0143625 A1 | 10/2002 | Waldeyer | |
| 2002/0166882 A1 | 11/2002 | Roberts et al. | |
| 2003/0003985 A1* | 1/2003 | Han | 463/17 |
| 2003/0023547 A1* | 1/2003 | France et al. | 705/39 |
| 2003/0104857 A1 | 6/2003 | Jenkins | |
| 2003/0139212 A1* | 7/2003 | Fulton | 463/17 |
| 2003/0187793 A1* | 10/2003 | Sawada | 705/40 |
| 2003/0228910 A1* | 12/2003 | Jawaharlal et al. | 463/42 |
| 2004/0030920 A1 | 2/2004 | Kroll et al. | |
| 2004/0183748 A1* | 9/2004 | Silverbrook et al. | 345/1.1 |
| 2004/0259626 A1* | 12/2004 | Akram et al. | 463/17 |
| 2005/0026694 A1* | 2/2005 | Kelly et al. | 463/42 |
| 2006/0046838 A1* | 3/2006 | Paulsen et al. | 463/25 |
| 2006/0052153 A1* | 3/2006 | Vlazny et al. | 463/17 |
| 2006/0071046 A1 | 4/2006 | Roberts et al. | |
| 2006/0080170 A1* | 4/2006 | Roach et al. | 705/14 |
| 2006/0160602 A1* | 7/2006 | Blythe et al. | 463/17 |
| 2006/0247970 A1* | 11/2006 | Sattelmaier | 705/14 |
| 2006/0259361 A1* | 11/2006 | Barhydt et al. | 705/14 |
| 2007/0060285 A1* | 3/2007 | White et al. | 463/18 |
| 2007/0088459 A1 | 4/2007 | Pollard et al. | |
| 2007/0192784 A1* | 8/2007 | Postrel | 725/23 |
| 2007/0198432 A1* | 8/2007 | Pitroda et al. | 705/64 |
| 2008/0167060 A1* | 7/2008 | Moshir et al. | 455/466 |
| 2009/0042631 A1* | 2/2009 | Randhawa | 463/17 |
| 2012/0015700 A1* | 1/2012 | Kroeckel et al. | 463/7 |

FOREIGN PATENT DOCUMENTS

| | | |
|---|---|---|
| CA | 1312379 | 1/1993 |
| CA | 2522369 | 4/2006 |
| EP | 0471896 | 2/1992 |
| GB | 2147773 | 5/1985 |
| WO | 9305483 | 3/1993 |
| WO | 03-061782 A1 | 7/2003 |
| WO | 2008-038254 A2 | 4/2008 |

* cited by examiner

FIG. 4

CLIENT REQUEST

○ Names and SS #'s of lottery players

○ Lottery numbers to play

○ Lottery game to play

○ Account numbers and names of corresponding institutions

○ Authorization to act on behalf of the specified lottery players

○ Other specifications

SYSTEM AND METHOD FOR ANONYMOUSLY SERVICING LOTTERY PLAYERS

TECHNICAL FIELD

Certain embodiments relate to business methods and systems. More particularly, certain embodiments relate to systems and methods for anonymously servicing lottery players.

BACKGROUND

Today's "big" lottery winners often become targets for thieves and criminals and are constantly being hounded by anyone and everyone that wants money from them. This is because everything about the lottery winner is broadcast to the world when they win. There is a need to protect the identity of such lottery winners while providing needed services to the lottery winners to, for example, protect their winning assets.

Further limitations and disadvantages of conventional, traditional, and proposed approaches will become apparent to one of skill in the art, through comparison of such approaches with the subject matter of the present application as set forth in the remainder of the present application with reference to the drawings.

BRIEF SUMMARY

An embodiment of the present invention comprises a method of servicing at least one lottery player while protecting an identity of the at least one lottery player. The method includes receiving a client request, from a client, at a server platform of a third party organization via a communications network. The method further includes the third party organization obtaining at least one lottery ticket in response to the client request, and securely holding the at least one lottery ticket for the at least one lottery player specified in the client request, while keeping an identity of the at least one lottery player secure. The method also includes the third party organization determining a status of the at least one lottery ticket via the server platform and the communications system. The method further includes the third party organization transforming the at least one lottery ticket into a monetary amount, while keeping an identity of the at least one lottery player secure, if a status of the at least one lottery ticket is, or changes to, a winning status. The method also includes the third party organization securely transferring at least a first portion of the monetary amount to at least one account or trust while keeping an identity of the at least one lottery player secure.

The method may also include the third party organization confirming to the client, via the server platform and the communications network, receipt of the client request. In accordance with an embodiment of the present invention, obtaining the at least one lottery ticket may be accomplished by the third party organization purchasing the at least one lottery ticket from an authorized distributor of lottery tickets. The method may further include the third party organization reporting to the client, via the server platform and the communications network, the purchasing of the at least one lottery ticket. As an option, the at least one lottery ticket may be purchased by the client and provided by the client to the third party organization, whether or not the status of the at least one lottery ticket is that of a winning status. For example, the corresponding lottery game may have already been played and the at least one lottery ticket may already be a winning ticket before being provided to the third party organization.

The method may also include the third party organization reporting to the client, via the server platform and the communications network, a change of status of the at least one lottery ticket to a winning status. The method may further include the third party organization insuring the lottery ticket, while keeping an identity of the at least one lottery player secure, if a status of the lottery ticket is a winning status.

In accordance with an embodiment of the present invention, the transforming may be accomplished by the third party organization redeeming the at least one lottery ticket from an authorized lottery agency, while keeping an identity of the at least one lottery player secure. The method may further include the third party organization reporting to the client, via the server platform and the communications network, the transforming of the at least one lottery ticket into the monetary amount. The method may also include the third party organization paying all applicable taxes and fees due on the monetary amount while keeping an identity of the at least one lottery player secure.

The method may further include the third party organization keeping a second portion of the monetary amount as payment for servicing the client request. In accordance with an embodiment of the present invention, the transferring may be performed electronically using the server platform and the communications network. Also, in accordance with an embodiment of the present invention, playable lottery numbers associated with the at least one lottery ticket may be specified in the client request. In accordance with an alternative embodiment of the present invention, playable lottery numbers associated with the at least one lottery ticket may be chosen randomly upon purchasing of the at least one lottery ticket by the third party organization. Furthermore, in accordance with an embodiment of the present invention, at least one account or trust may be specified in the client request. In accordance with an alternative embodiment of the present invention, the third party organization may set up at least one account or trust based on an identity of the at least one lottery player.

As an option, the third party organization may pay any of assessments, liens, back child support, back taxes, penalties, and interest owed by the at least one lottery player out of the winning amount, while keeping an identity of the at least one lottery player secure.

Another embodiment of the present invention comprises a server platform of a third party organization for protecting the identity of at least one lottery player. The server platform facilitates a method including receiving a client request, from a client, at the server platform of the third party organization via a communications network. The method further includes the third party organization obtaining at least one lottery ticket in response to the client request, and securely holding the at least one lottery ticket for the at least one lottery player specified in the client request, while keeping an identity of the at least one lottery player secure. The method also includes the third party organization determining a status of the at least one lottery ticket via the server platform and the communications system. The method further includes the third party organization transforming the at least one lottery ticket into a monetary amount, while keeping an identity of the at least one lottery player secure, if a status of the at least one lottery ticket is, or changes to, a winning status. The method also includes the third party organization securely transferring at least a first portion of the monetary amount to at least one account or trust while keeping an identity of the at least one lottery player secure.

The facilitated method may further include the server platform confirming to the client, via the communications network, receipt of the client request. In accordance with an embodiment of the present invention, obtaining the at least one lottery ticket may be accomplished by the third party organization purchasing the at least one lottery ticket from an authorized distributor of lottery tickets. The facilitated method may further include the server platform reporting to the client, via the communications network, the purchasing of the at least one lottery ticket.

The facilitated method may also include the server platform reporting to the client, via the communications network, a change of status of the at least one lottery ticket to a winning status. The facilitated method may further include the third party organization insuring the winning lottery ticket, while keeping an identity of the at least one lottery player secure, if a status of the lottery ticket is a winning status.

In accordance with an embodiment of the facilitated method, the transforming may be accomplished by the third party organization redeeming the at least one lottery ticket from an authorized lottery agency while keeping an identity of the at least one lottery player secure. In the facilitated method, the serve platform may report to the client, via the communications network, the transforming of the at least one lottery ticket into the monetary amount.

The facilitated method may further include the third party organization paying all applicable taxes and fees due on the monetary amount while keeping an identity of the at least one lottery player secure. The facilitated method may also include the third party organization keeping a second portion of the monetary amount as payment for servicing the client request.

In accordance with an embodiment of the present invention, the transferring may be performed electronically using the server platform and the communications network. Furthermore, playable lottery numbers associated with the at least one lottery ticket may be specified in the client request. As an alternative, playable lottery numbers associated with the at least one lottery ticket may be chosen randomly upon purchasing of the at least one lottery ticket by the third party organization.

In accordance with an embodiment of the present invention, the at least one account or trust may be specified in the client request. As an alternative, the facilitated method may include the third party organization setting up the at least one account or trust based on an identity of the at least one lottery player.

These and other novel features of the subject matter of the present application, as well as details of illustrated embodiments thereof, will be more fully understood from the following description and drawings.

BRIEF DESCRIPTION OF THE DRAWINGS

FIG. 4 illustrates an exemplary embodiment of the type of information that makes up a client request used in the method of FIG. 3.

DETAILED DESCRIPTION

Figure 1:
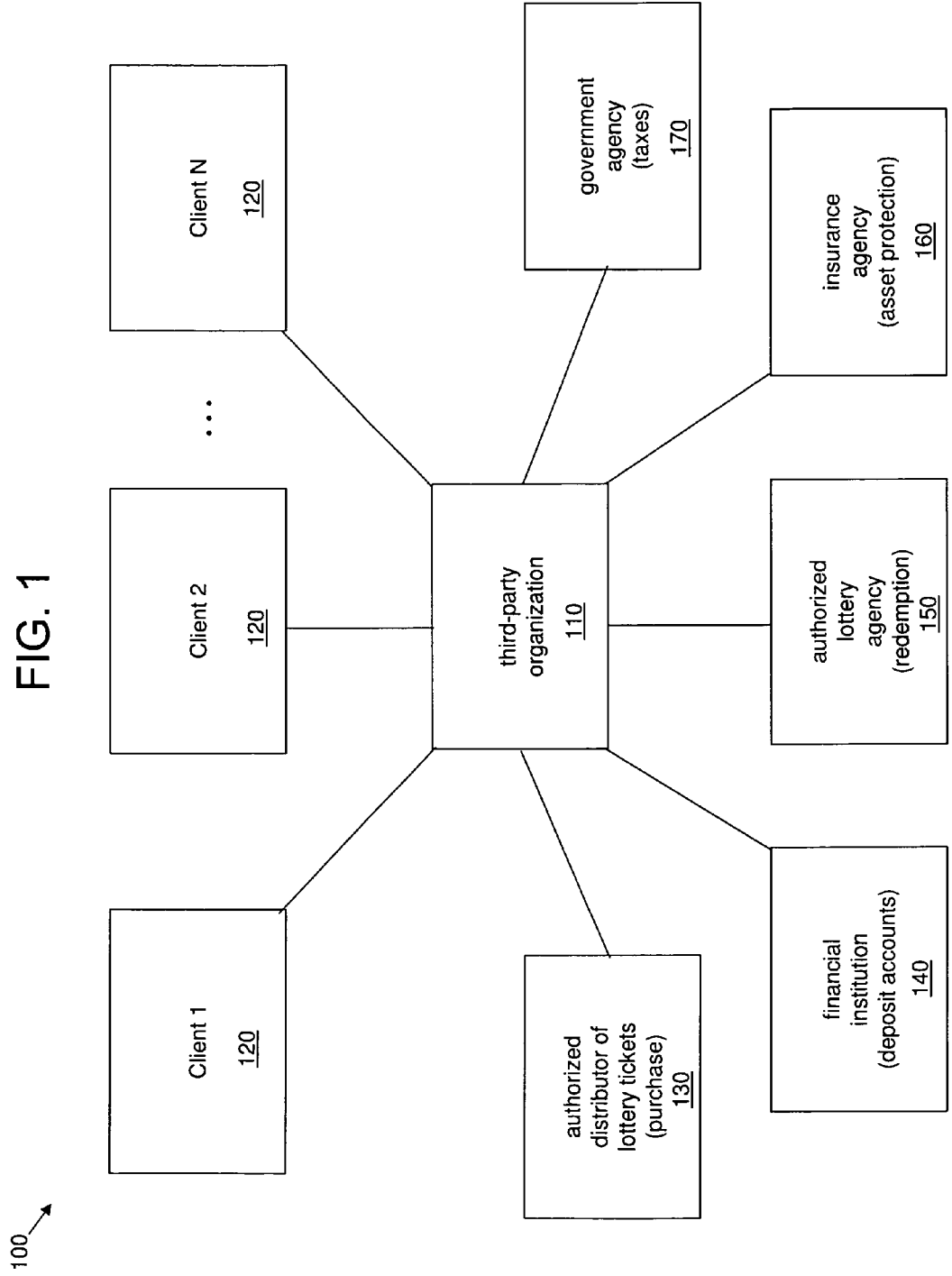
FIG. 1 illustrates a block diagram of an exemplary embodiment of an organizational structure for facilitating the servicing of lottery players while protecting identities of the lottery players.

FIG. 1 illustrates a block diagram of an exemplary embodiment of an organizational structure 100 for facilitating the servicing of lottery players while protecting identities of the lottery players. At the center of the organizational structure is a third party organization 110 which acts as an intermediary between one or more clients 120 and other agencies and institutions. The third party organization 110 acts on behalf of the clients 120 while helping to keep the identity of the clients anonymous.

In accordance with an embodiment of the present invention, the organizational structure 100 further includes an authorized distributor of lottery tickets 130, a financial institution 140, an authorized lottery agency 150, an insurance agency 160, and a government agency 170. The relationships and functional interactions that take place between the third party organization 110 and the other elements of the organizational structure 100 are described herein in detail, in accordance with various embodiments of the present invention.

Figure 2:
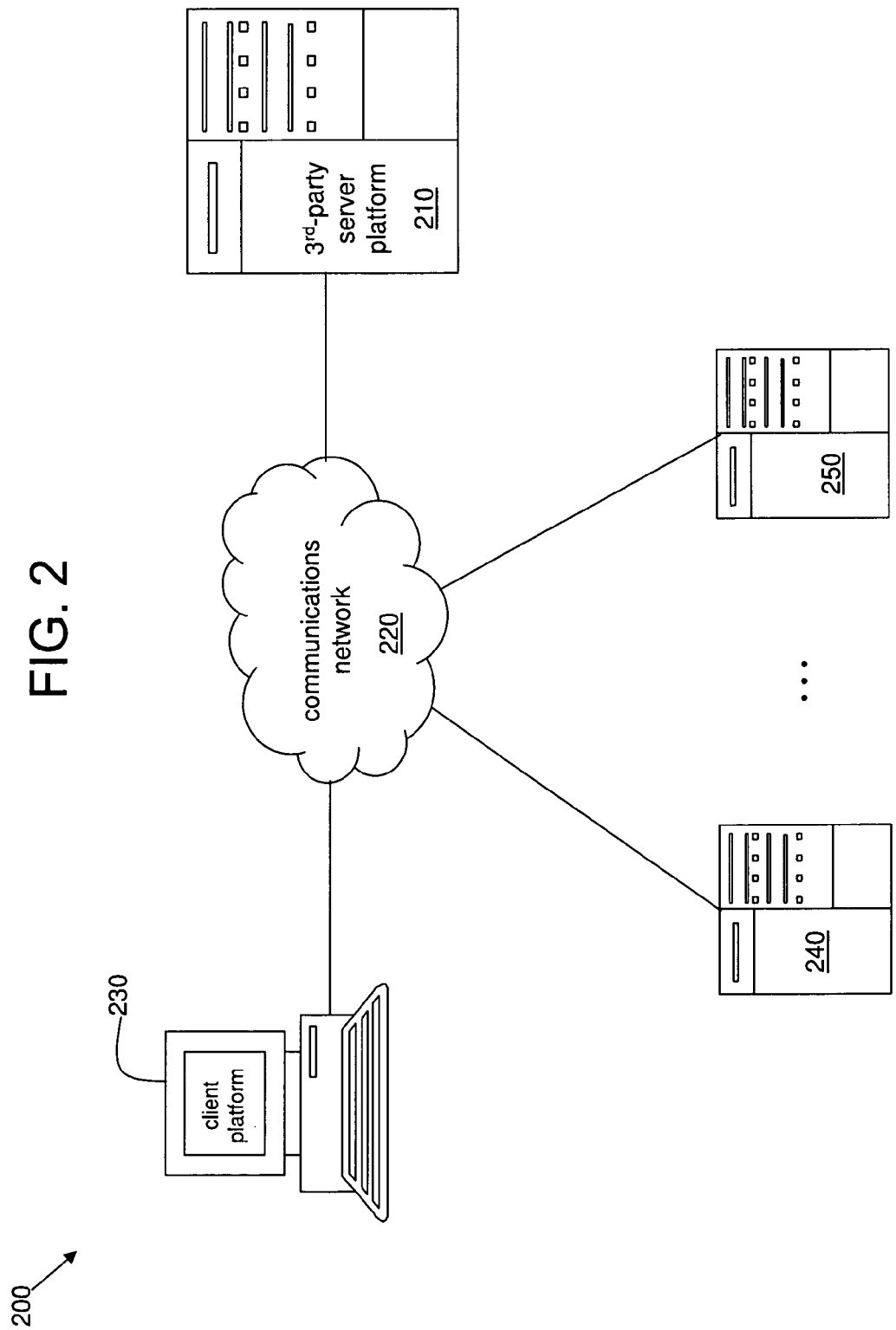
FIG. 2 illustrates a functional block diagram of an exemplary embodiment of a system used in the organizational structure of FIG. 1 for facilitating the servicing of lottery players while protecting identities of the lottery players.

FIG. 2 illustrates a functional block diagram of an exemplary embodiment of a system 200 used in the organizational structure 100 of FIG. 1 for facilitating the servicing of lottery players while protecting identities of the lottery players. The system includes a third party server platform 210 that is operationally connected to a communications network 220 (e.g., the Internet). The third party server platform 210 is operated by the third party organization 110.

The system 200 also includes at least one client platform 230 operationally connected to the communications network 220. The client platform 230 may include a personal computer (PC) running a web browser, for example. The system 200 may also include various other computer-based platforms (e.g., 240 and 250) which are operationally connected to the communications network 220. For example, the computer-based platform 240 may be a server platform associated with the financial institution 140, and the computer-based platform 250 may be a server platform associated with the government agency 170.

Figure 3:
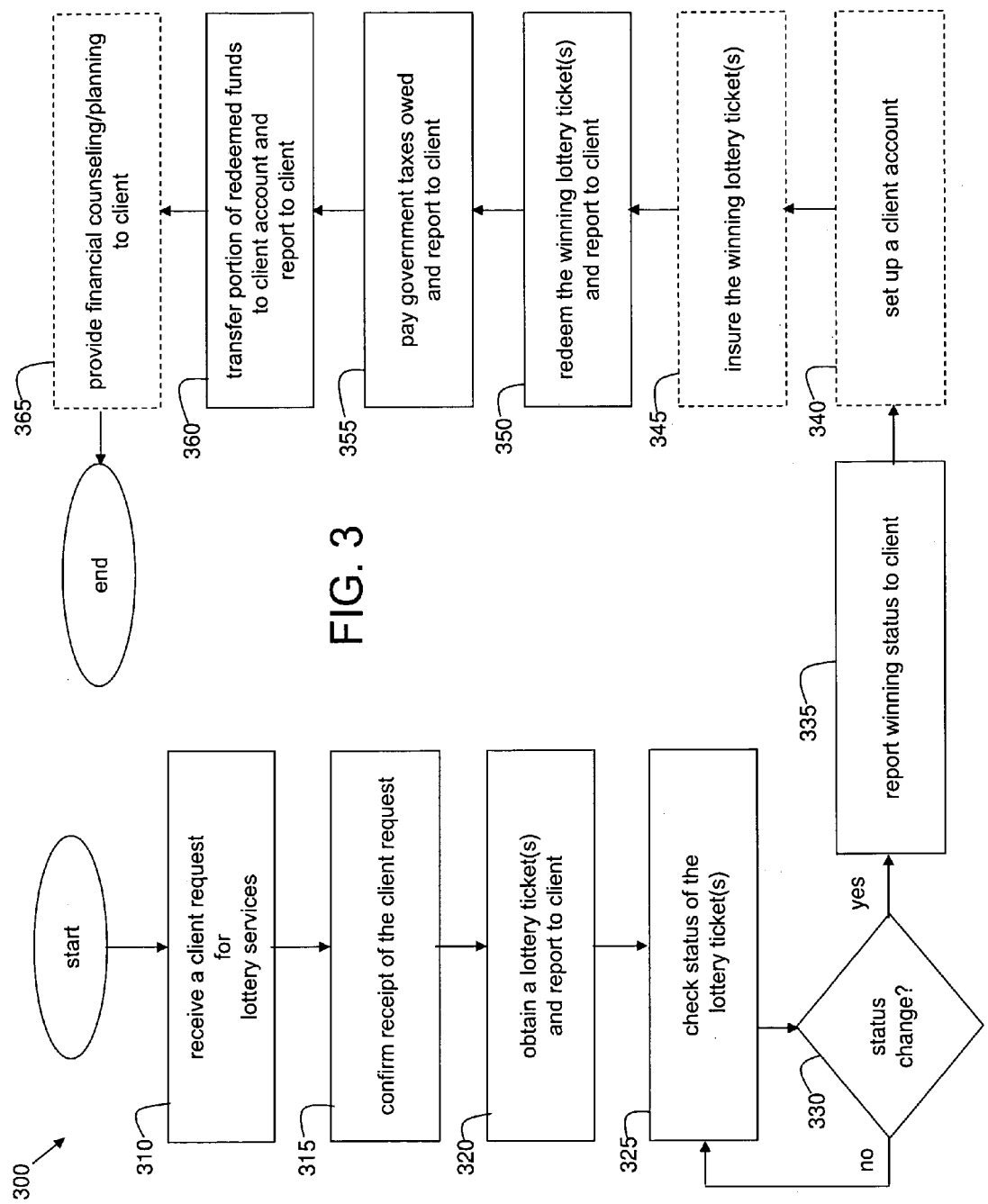
FIG. 3 illustrates a flow chart of an exemplary embodiment of a method of servicing at least one lottery player, using the organizational structure of FIG. 1 and the system of FIG. 2, while protecting an identity of the at least one lottery player.

FIG. 3 illustrates a flow chart of an exemplary embodiment of a method 300 of servicing at least one lottery player, using the organizational structure 100 of FIG. 1 and the system 200 of FIG. 2, while protecting an identity of the at least one lottery player. In step 310, a client request, from a client 120 (using the client platform 230), is received at a server platform 210 of a third party organization via a communications network 220. In accordance with an embodiment of the present invention, the client request is for lottery-related services and may be sent from a client platform 230 residing in, for example, the client's home.

FIG. 4 illustrates an exemplary embodiment of the type of information that makes up a client request used in the method 300 of FIG. 3. The client request may include the names and social security numbers of lottery players associated with the client request as well as lottery numbers to be played in a particular lottery game. In this way, if multiple lottery players decide to join together and share any lottery winnings, the lottery players and the associated lottery numbers are well documented in the client request. This may help avoid any later disputes between lottery players. The client request may also include account numbers and names of institutions where winning monetary amounts are to be deposited for the various lottery players. Furthermore, the client request may include a statement giving the third party organization 110 explicit authorization to act of behalf of the named lottery players with respect to the lottery services provided by the third party organization 110. Other specifications may be possible as well within the client request.

In step 315, the third party organization 110 confirms receipt of the client request back to the client 120 (i.e., back to the client platform 230) via the server platform 210 and the communications network 220. In step 320, the third party organization 110 obtains at least one lottery ticket in response to the client request and securely holds the lottery ticket for the lottery players specified in the client request while keeping an identity of the lottery players secure and anonymous to the outside world. The third party organization 110 may report the obtaining of the lottery ticket (or tickets) to the client 120 (i.e., to the client platform 230) via the server platform 210 and the communications network 220.

In accordance with an embodiment of the present invention, the third party organization 110 may obtain the lottery ticket by purchasing the lottery ticket from an authorized distributor of lottery tickets 130. The purchasing of the lottery ticket for the client may be done by the third party organization 110 in person or on-line via the server platform 210 and the communications network 220. For example, the authorized distributor of lottery tickets 130 may provide a server platform 240 allowing the purchase of lottery tickets on-line. The third party organization 110 purchases the lottery ticket (or tickets) using the lottery numbers specified in the client request. As an alternative, the third party organization 110 may purchase the lottery ticket (or tickets) using random lottery number selection, as may be provided by the authorized distributor of lottery tickets 130. As a further alternative, the lottery tickets may be obtained via the client 120 providing the physical lottery tickets to the third party organization 110. For example, a lottery ticket provided by the client 120 to the third party organization 110 may already have the status of being a winning lottery ticket. The third party organization 110 will still want to verify (i.e., determine) independently that the ticket is a winning ticket.

In step 325, the third party organization 110 checks or determines the status of the lottery ticket (or tickets) via the server platform 210 and the communications network 220. For example, the authorized lottery agency 150 may provide a server platform 250, allowing the third party organization 110 to check for winning lottery numbers on-line for a particular lottery game and drawing to which the lottery ticket (or tickets) correspond. As an alternative, a server platform (e.g., 250) provided by the authorized lottery agency may automatically send lottery game results to the server platform 210 via the communications network 220. The server platform 210 may perform an automatic comparison of winning lottery numbers to client played lottery numbers in order to determine a status (winning or losing) of the lottery tickets. The server platform 210 may include a database of clients and associated client information, including played lottery numbers, for example.

If the status of a lottery ticket changes to a winning status (step 330) as verified by the third party organization 110 through the authorized lottery agency 150, then in step 335 the winning status is reported to the client 120 (i.e., to the client platform 230) via the server platform 210 and the communications network 220.

If the client 120 has not specified one or more accounts in the client request then, in optional step 340, the third party organization 110 may set up one or more accounts for the specified lottery players into which a portion of the winning amount may be deposited by the third party organization 110 on behalf of the specified lottery players. The accounts may be set up at one or more financial institutions 140 which may be a bank or an investment and trading company, for example. An account may be a simple bank account or investment account, or may be a more complicated trust, for example.

Furthermore, in optional step 345, the third party organization 110 may insure the winning lottery ticket (or tickets) up to, for example, the winning amount. The third party organization 110 may work with an insurance agency 160 to properly insure the winning lottery ticket (or tickets). Such insurance may protect the lottery players (and, in a liability sense, the third party organization 110) against the possibility of the winning lottery ticket being lost, damaged, or stolen, for example.

In step 350, the third party organization 110 transforms the winning lottery ticket into a monetary amount, while keeping an identity of the lottery players secure. In accordance with an embodiment of the present invention, the winning lottery ticket is transformed by redeeming the winning lottery ticket at or through the authorized lottery agency 150 while keeping an identity of the lottery players secure and anonymous. The redemption of the winning lottery ticket may be reported to the client 120 (i.e., to the client platform 230) via the server platform 210 and the communications network 220.

In step 355, the third party organization 110 pays any applicable taxes and fees that are due or owed on the winning monetary amount to the appropriate (e.g., government) agency or agencies 170 (e.g., local, state, federal). In accordance with an embodiment of the present invention, the taxes and/or fees may be paid by the third party organization 110 to the agency 170 on-line to a server (e.g., 250) provided by the agency 170 using the server platform 210 and communications network 220. As an alternative, the authorized lottery agency 150 may pay the taxes and fees due before distributing the remaining portion of the winning monetary amount. As a further option, if the client has any assessments, liens, back child support, back taxes, penalties, interest, etc. that he may owe, the third party organization 110 may be authorized to pay these owed monies out of the winning monetary amount.

In step 360, the third party organization 110, having received the winning monetary amount (or a portion thereof) from the authorized lottery agency 150, securely transfers at least a first portion of the winning monetary amount to at least one account or trust being in the names of the lottery players, while keeping an identity of the lottery players secure and anonymous to the outside world. The third party organization 110 may hold back a second portion of the winning monetary amount as payment for servicing the client request. The transfer may be performed electronically using the server platform 210 and the communications network 220. For example, the transfer may be made to a server platform 240 of the financial institution 140 where an account has been set up for the lottery player. The third party organization 110 may report to the client 120 (i.e., to the client platform 230), via the server platform 210 and the communications network 220, the transfer of the monetary amount.

In optional step 365, the third party organization may offer and/or provide financial counseling or planning to the lottery players. Such financial planning or counseling may deal with, for example, investment strategies, inheritance and wills, trusts, real estate, and personal money management.

In summary, a system and method for servicing at least one lottery player while protecting an identity of the at least one lottery player are disclosed. A client may, from a personal computer in his home, go on-line and submit a client request to a third party organization. The third party organization, from that point forward, may handle all or some of the details of playing the lottery game or games specified in the client request and collecting and distributing any winnings, all while keeping an identity of the lottery players secure and anonymous to the outside world.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A method of servicing at least one lottery player while protecting an identity of said at least one lottery player, said method comprising:
   receiving a client request, from a client, at a server platform of a third party organization via a communications network;
   said server platform obtaining, from an authorized lottery agency, at least one lottery ticket in response to said client request and securely holding said at least one lottery ticket for at least one lottery player specified in said client request while keeping an identity of said at least one lottery player anonymous;
   said server platform determining, via the authorized lottery agency, a status of said at least one lottery ticket via said communications network;
   said server platform transforming said at least one lottery ticket into a monetary amount, while keeping an identity of said at least one lottery player anonymous, in response to a status of said at least one lottery ticket being determined to be a winning status,
   wherein said transforming is accomplished by said server platform redeeming said at least one lottery ticket from said authorized lottery agency, while keeping an identity of said at least one lottery player anonymous; and
   said server platform securely transferring at least a first portion of said monetary amount to at least one account or trust while keeping an identity of said at least one lottery player anonymous.

2. The method of claim 1 further comprising said server platform confirming to said client, via said communications network, receipt of said client request.

3. The method of claim 1 wherein said obtaining of said at least one lottery ticket is accomplished by said server platform purchasing said at least one lottery ticket from an authorized distributor of lottery tickets.

4. The method of claim 3 further comprising said server platform reporting to said client, via said communications network, said purchasing of said at least one lottery ticket.

5. The method of claim 1 further comprising said server platform reporting to said client, via said communications network, a change of status of said at least one lottery ticket to a winning status.

6. The method of claim 1 further comprising said server platform insuring said winning lottery ticket, while keeping an identity of said at least one lottery player anonymous, if a status of said lottery ticket is a winning status.

7. The method of claim 1 further comprising said server platform reporting to said client, via said communications network, said transforming of said at least one lottery ticket into said monetary amount.

8. The method of claim 1 further comprising said server platform arranging to pay all applicable taxes and fees due on said monetary amount while keeping an identity of said at least one lottery player anonymous.

9. The method of claim 1 further comprising said server platform keeping a second portion of said monetary amount as payment for servicing said client request.

10. The method of claim 1 wherein said transferring is performed electronically using said server platform and said communications network.

11. The method of claim 1 wherein playable numbers associated with said at least one lottery ticket are specified in said client request.

12. The method of claim 3 wherein playable numbers associated with said at least one lottery ticket are chosen randomly upon purchasing of said at least one lottery ticket by said server platform.

13. The method of claim 1 wherein said at least one account or trust is specified in said client request.

14. The method of claim 1 further comprising said server platform setting up said at least one account or trust based on an identity of said at least one lottery player.

15. A server platform of a third party organization for protecting the identity of at least one lottery player, said server platform programmed to facilitate the method comprising:
   receiving a client request, from a client, at said server platform of said third party organization via a communications network;
   said server platform obtaining, from an authorized lottery agency, at least one lottery ticket in response to said client request and securely holding said at least one lottery ticket for at least one lottery player specified in said client request while keeping an identity of said at least one lottery player anonymous;
   said server platform determining, via the authorized lottery agency, a status of said at least one lottery ticket via said communications network;
   said server platform transforming said at least one lottery ticket into a monetary amount, while keeping an identity of said at least one lottery player anonymous, in response to a status of said at least one lottery ticket being determined to be a winning status,
   wherein said transforming is accomplished by said server platform redeeming said at least one lottery ticket from said authorized lottery agency, while keeping an identity of said at least one lottery player anonymous; and
   said server platform securely transferring at least a first portion of said monetary amount to at least one account or trust while keeping an identity of said at least one lottery player anonymous.

16. The server platform of claim 15 wherein said facilitated method further comprises said server platform confirming to said client, via said communications network, receipt of said client request.

17. The server platform of claim 15 wherein said obtaining of said at least one lottery ticket is accomplished by said server platform purchasing said at least one lottery ticket from an authorized distributor of lottery tickets.

18. The server platform of claim 17 wherein said facilitated method further comprises said server platform reporting to said client, via said communications network, said purchasing of said at least one lottery ticket.

19. The server platform of claim 15 wherein said facilitated method further comprises said server platform reporting to said client, via said communications network, a change of status of said at least one lottery ticket to a winning status.

20. The server platform of claim 15 wherein said facilitated method further comprises said server platform arranging to insure said winning lottery ticket, while keeping an identity of said at least one lottery player anonymous, if a status of said lottery ticket is a winning status.

21. The server platform of claim 15 wherein said facilitated method further comprises said server platform reporting to said client, via said communications network, said transforming of said at least one lottery ticket into said monetary amount.

22. The server platform of claim 15 wherein said facilitated method further comprises said server platform arranging to pay all applicable taxes and fees due on said monetary amount while keeping an identity of said at least one lottery player anonymous.

23. The server platform of claim 15 wherein said facilitated method further comprises said server platform keeping a second portion of said monetary amount as payment for servicing said client request.

24. The server platform of claim 15 wherein said transferring is performed electronically using said server platform and said communications network.

25. The server platform of claim 15 wherein playable numbers associated with said at least one lottery ticket are specified in said client request.

26. The server platform of claim 17 wherein playable numbers associated with said at least one lottery ticket are chosen randomly upon purchasing of said at least one lottery ticket by said server platform.

27. The server platform of claim 15 wherein said at least one account or trust is specified in said client request.

28. The server platform of claim 15 wherein said facilitated method further comprises said server platform setting up said at least one account or trust based on an identity of said at least one lottery player.

29. The method of claim 1 further comprising said server platform arranging to pay any of assessments, liens, back child support, back taxes, penalties, and interest owed by said at least one lottery player while keeping an identity of said at least one lottery player anonymous.

* * * * *